(12) United States Patent
Perret et al.

(10) Patent No.: US 7,820,241 B2
(45) Date of Patent: Oct. 26, 2010

(54) DEVICE AND METHOD FOR APPLYING LAYERS OF A POWDER MATERIAL ONTO A SURFACE

(75) Inventors: Hans Perret, Munich (DE); Thomas Halder, Munich (DE); Jochen Philippi, Munich (DE); Peter Keller, Krailling (DE); Gerd Cantzler, Neuried (DE); Michael Göth, Munich (DE)

(73) Assignee: EOS GmbH Electro Optical Systems (DE)

( * ) Notice: Subject to any disclaimer, the term of this patent is extended or adjusted under 35 U.S.C. 154(b) by 733 days.

(21) Appl. No.: 11/667,345

(22) PCT Filed: Mar. 21, 2006

(86) PCT No.: PCT/EP2006/002572

§ 371 (c)(1),
(2), (4) Date: May 8, 2007

(87) PCT Pub. No.: WO2006/108499

PCT Pub. Date: Oct. 19, 2006

(65) Prior Publication Data

US 2007/0298182 A1 Dec. 27, 2007

(30) Foreign Application Priority Data

Apr. 12, 2005 (DE) .................. 10 2005 016 940

(51) Int. Cl.
*B05D 7/00* (2006.01)

(52) U.S. Cl. .................. 427/213; 264/401; 37/407
(58) Field of Classification Search .................. 264/401; 37/407

See application file for complete search history.

(56) References Cited

U.S. PATENT DOCUMENTS 3,985,099 A * 10/1976 Nagashima et al. .......... 399/269

(Continued)

FOREIGN PATENT DOCUMENTS

DE 4325573 A1 2/1995

(Continued)

*Primary Examiner*—Parviz Hassanzadeh
*Assistant Examiner*—Albert Hilton
(74) *Attorney, Agent, or Firm*—McDonnell Boehnen Hulbert & Berghoff LLP (57) ABSTRACT

A device (51) for applying layers or a powder material (71) by means of an application device (52) is described, wherein the application device (52) can be moved back and forth between two end positions in order to apply a layer of material (71) and the application device (52) comprises a blade (56) for removing excess material during the application of a layer of material (71). The device (51) is characterized by a material transport device (53), by which the material can be transferred from one side of the blade (56) to the other side of the blade. The device has the particular advantage that layers of material (71) can be applied without any loss of material and is particularly applicable in a laser sintering device.

10 Claims, 6 Drawing Sheets

U.S. PATENT DOCUMENTS

| | | | |
|---|---|---|---|
| 4,288,466 A * | 9/1981 | Heckman et al. | 427/461 |
| 4,863,538 A | 9/1989 | Deckard | |
| 5,121,329 A * | 6/1992 | Crump | 700/119 |
| 5,730,925 A | 3/1998 | Mattes et al. | |
| 6,136,257 A | 10/2000 | Graf et al. | |
| 6,811,744 B2 * | 11/2004 | Keicher et al. | 419/5 |
| 2002/0195746 A1 * | 12/2002 | Hull et al. | 264/401 |
| 2005/0074550 A1 | 4/2005 | Leuterer et al. | |

FOREIGN PATENT DOCUMENTS

| | | | |
|---|---|---|---|
| DE | 19514750 | C1 | 4/1996 |
| DE | 19853978 | C1 | 5/2000 |
| EP | 0945202 | A2 | 2/1999 |
| EP | 1270185 | A1 | 1/2003 |
| GB | 2069930 | A * | 9/1981 |
| JP | 2001-38812 | A | 2/2001 |
| JP | 2004-524995 | AI | 8/2004 |
| RU | 2 021 881 | C1 | 10/1994 |
| WO | WO9308928 | A1 | 5/1993 |

* cited by examiner

DEVICE AND METHOD FOR APPLYING LAYERS OF A POWDER MATERIAL ONTO A SURFACE

The present invention is related to a device and a method for applying layers of a powder material onto a surface according to the preamble of the claims as well as to a device for manufacturing a three-dimensional object according to the preamble of the claims.

Such a device and such a method for applying layers of a powder material are known e.g. from DE 195 14 740 C1. The application device described in DE 195 14 740 C1 with respect to a laser sintering device comprises a single blade, which shifts a supply of material in front of it when applying a layer. Here, the problem is that the supply of material for a layer either is too small, so that no complete layer can be applied within the work space (production area), or else that the supply is larger than the amount that is necessary for one layer, so that excess material is shifted out of the work space to the outside. This excess material is no longer used for the application of a further layer. Therefore, it has to be collected in special collecting receptacles and contributes to an increased material consumption.

From EP 945 202 A2 a application device having two blades is known. Like the application device described in DE 195 14 740 C1 also this application device has the problem that while a layer is applied, excess material in front of the leading blade in the direction of movement of the application device is shifted out of the work space to the outside. Also here, this material, which is shifted to the outside by the blade, is not used for the application of a further layer and therefore contributes to an increased material consumption as above.

The material to be applied may consist of various materials such as polymers, metals, ceramics or composite materials. Depending on the material and the process control in a device for manufacturing a three-dimensional object a heating of the layers can be applied. In this case the material that has been accumulated in the peripheral region can be thermally damaged during the manufacturing of a three-dimensional object depending on the material, in particular when using polymers, and thus may become useless for a re-use.

Therefore, the object of providing a device and a method for applying layers of a powder material, by which the layers may be applied reliably and without any loss of material, forms the basis of the present invention.

The object is achieved by a device and a method, respectively, for applying layers of a powder material according to the claims.

The invention has the advantage that the material, which is shifted by a blade of the application device from the work space to the outside while a layer is applied, is reused for the application of the next layer. Therefore, no loss of material occurs.

When using a supply system, where the supply of material to a supply area is halted when a predetermined amount of material is present in the supply area, a self-regulating dosage of the material supply occurs, even when the excess material incurred while a layer is applied is transported by the blade into the supply area.

A further advantage of the invention is that the thermal stress of the material that accumulates in excess when a layer is applied, is small.

When an elevated process temperature is needed, the use of a material transport system having a heated tray has the advantage that the material is preheated before the application as a layer. Thereby, the building time is reduced.

When using a material transport device formed as fluidization device, wherein the fluidization occurs through a pre-heated gas, there is the advantage that the fluidized powder is pre-heated and thus the building time can be shortened, in case an elevated process temperature is needed.

Further features and advantages of the invention will arise from the description of embodiments by means of the accompanying drawings, of which.

Figure 1:
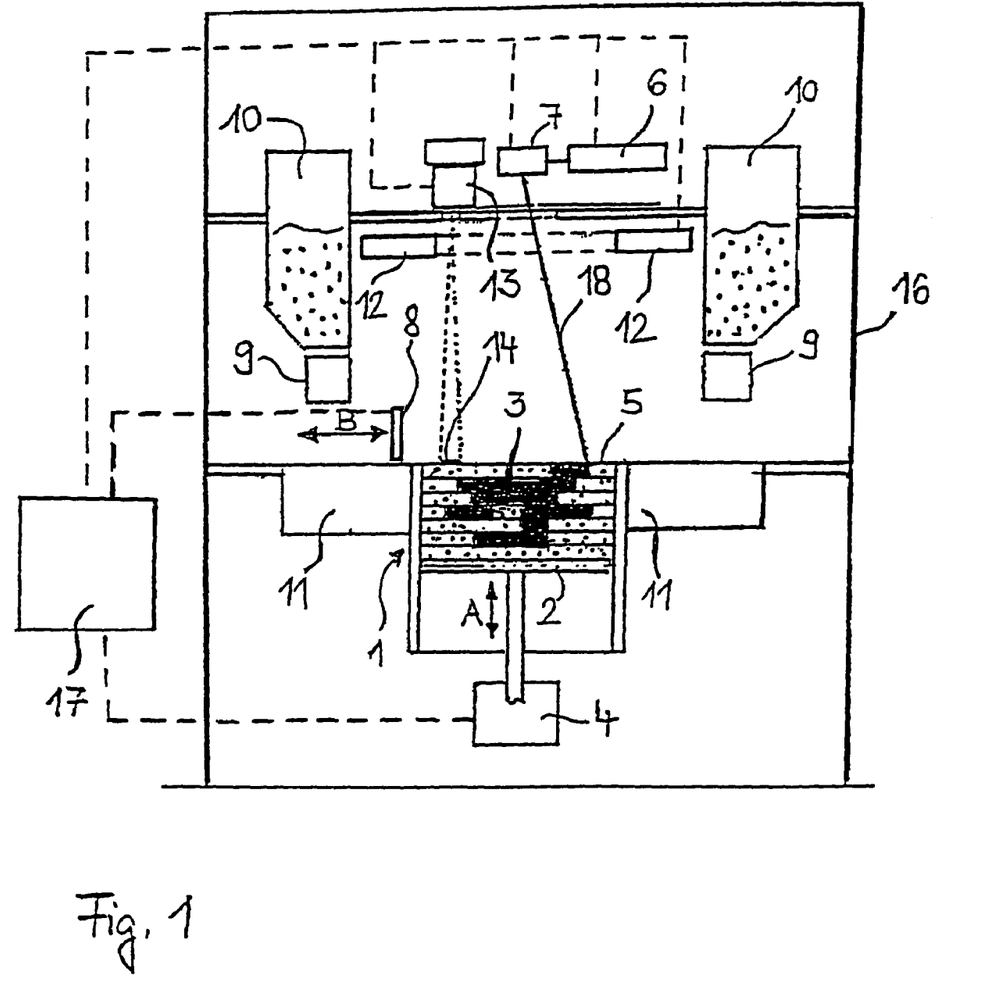
FIG. 1 shows a schematic diagram of a laser sintering device having the device according to the invention.

FIG. 1 shows a laser sintering device as embodiment of a device for manufacturing a three-dimensional object, in which the device according to the invention and the method according to the invention are used. The laser sintering device has a container 1 open to the top. A support 2 for supporting the object 3 to be formed is provided in the container 1. The support 2 can be moved in the container 1 in the vertical direction A up and down by means of a drive 4. The upper edge of the container 1 defines a work plane 5 (construction field). An irradiation device 6 in the form of a laser, which emits a directed laser beam that is deflected onto the work plane 5 by a deflection device 7, is arranged above the work plane 5. Moreover, an application device 8 for applying a layer of the powder material to be solidified onto the surface of the support 2 or a previously solidified layer is provided. The application device 8 can be moved back and forth across the work plane 5 between two end positions by a drive that is schematically indicated by the arrows B. The application device is fed from two powder supply containers 10 via two material supply devices 9 at the left side and the right side of the construction field as well as two material transport devices 11.

Moreover, the device comprises a heating device 12 arranged above the work plane 5 for pre-heating an applied but not yet sintered powder layer to a working temperature $T_A$ suitable for the solidification and the sintering, respectively.

A temperature measuring device 13 in the form of e.g. a pyrometer or IR camera, which serves for measuring the temperature of the previously applied powder layer or top powder layer in a measurement area 14, is provided at a distance above the work plane 5.

The work plane is secluded from the environment by a process chamber 16. Thereby, the oxidation of the powder may be prevented, if necessary.

A control and/or regulation device 17 serves for controlling and/or regulating the movement B of the application device 8, the movement A of the support 2, the power of the heating device 12, the power of the irradiation device 6 and the deflection by a deflection device 7. For this purpose the control and/or regulation device 17 is connected to the drive of the application device 8, the drive 4, the heating device 12, the temperature measuring device 13, the deflection device 7 as well as the irradiation device 6.

Figure 2:
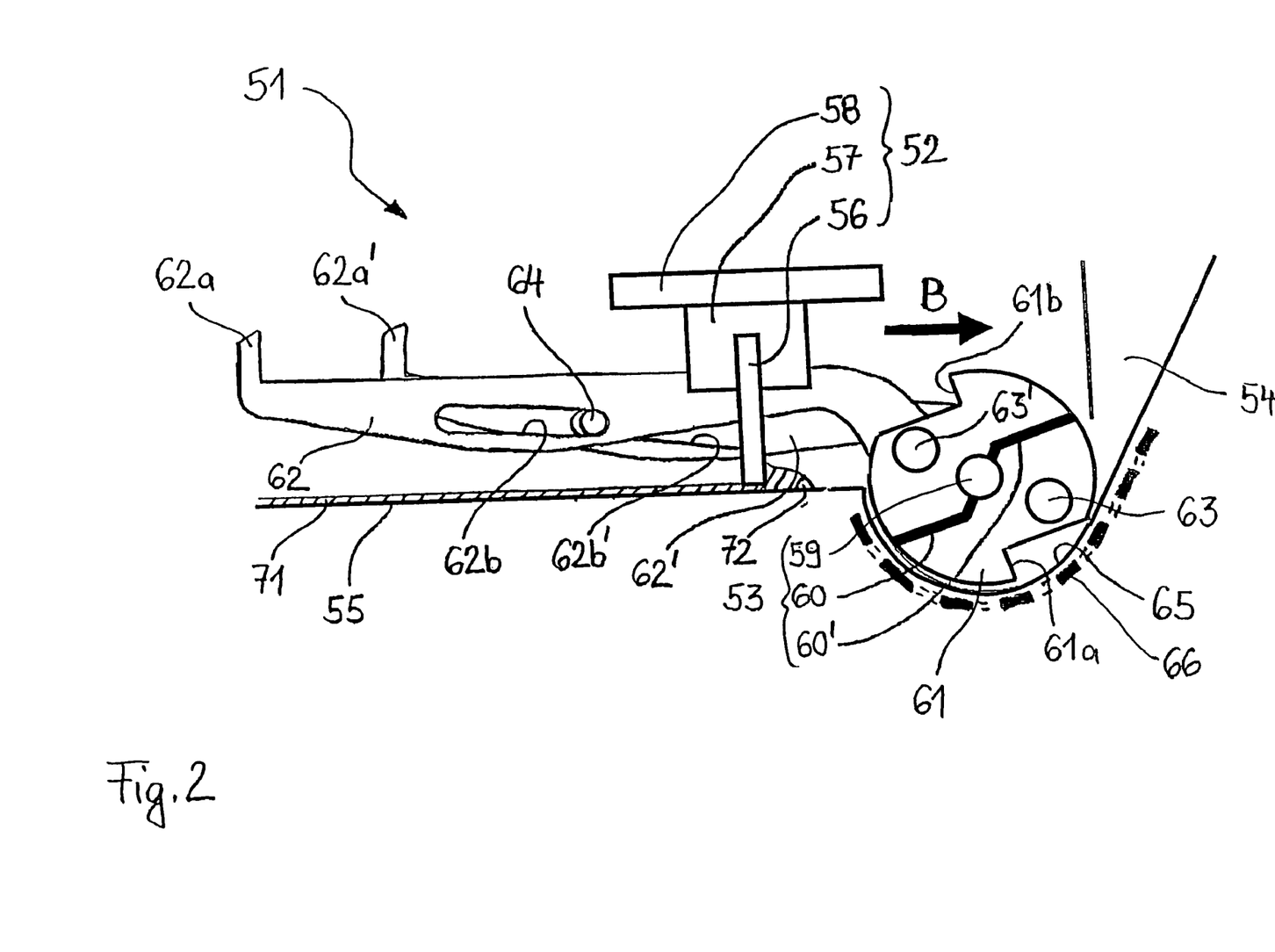
FIG. 2 shows a schematic diagram of a first embodiment of the device for applying layers of a powder material.

FIG. 2 shows a first embodiment of the device for applying layers of a material in powder form.

The device 51 for applying a layer of a material in powder form according to a first embodiment comprises an application device 52, a material transport device designed as conveyor roller 53 as well as a material supply device designed as a feeding chute 54.

The application device 52 is movable back and forth between two end positions above a work plane 55 (construction field) by a drive indicated by the arrow B. It comprises a blade 56, a first actuation element 57 and a second actuation element 58.

The conveyor roller 53 has two paddles 60, 60' that are rotating around a common axis 59. Perpendicular to the axis 59 a cam plate 61 having two cams 61a and 61b is fixed to the conveyor roller 53.

Each of two oblong con-rods 62, 62' has a first end that is connected to the cam plate 61 in such a way that an eccentrical rotation is possible. Each con-rod 62, 62' has at its other, second, end a hook-shaped portion 62a and 62a', respectively, which serves as point of application for the second actuation element 58 of the application device. The axes or rotation 63, 63', around which the two con-rods 62, 62' are rotatable with respect to the cam plate 61, together with the axis 59 are located in a common plane and are parallel to the axis 59. The con-rods 62, 62' in each case have an elongated hole 62b and 62b', respectively, between the first and the second end. The movement of the con-rods 62, 62' is guided by a pin 64 inserted into both elongated holes 62b, 62b', wherein the pin can not be moved with respect to the position of the conveyor roller. The elongated holes 62b, 62b' are designed such that both hook-shaped portions 62a, 62a', when the conveyor roller is rotated, do not only move parallel to the work plane 55 due to the guidance by the pin 64, but also do move up and down perpendicularly to the work plane.

When looking in the direction of movement B of the application device, the conveyor roller is located in a trough 65 provided with a heating 66 at the side of the work plane 55. This trough 65 is adapted to the conveyor roller 53 such that the ends of the paddles 60, 60' move along the wall of the trough when the conveyor roller 53 is rotated in the trough 65.

The feeding chute 54 is located at the side of the trough 65 facing away from the work plane 55. The feeding chute 54 serves for feeding the powder for the manufacturing of a powder layer to the application device 52.

In the following the operation of the previously described laser sintering device corresponding to a method according to a first embodiment is described.

As illustrated in FIG. 2, initially a first powder layer 71 is applied onto the support 2 or a previously solidified layer by moving the application device 52 in parallel to the work plane 55. In the process excess powder 72 is moved out of the construction field to the outside by the blade 56.

In an operating stage of the device according to the first embodiment, which is shown in FIG. 2, the first paddle 6b is positioned below the work plane 55 and the application device approaches the conveyor roller 53 in order to produce a first layer 71 of the material in powder form. Finally, the above-mentioned excess material 72 is pushed by the blade 56 onto the first paddle 60 (for clarity reasons in FIG. 2 no powder is shown in the material transport device).

Figure 3:
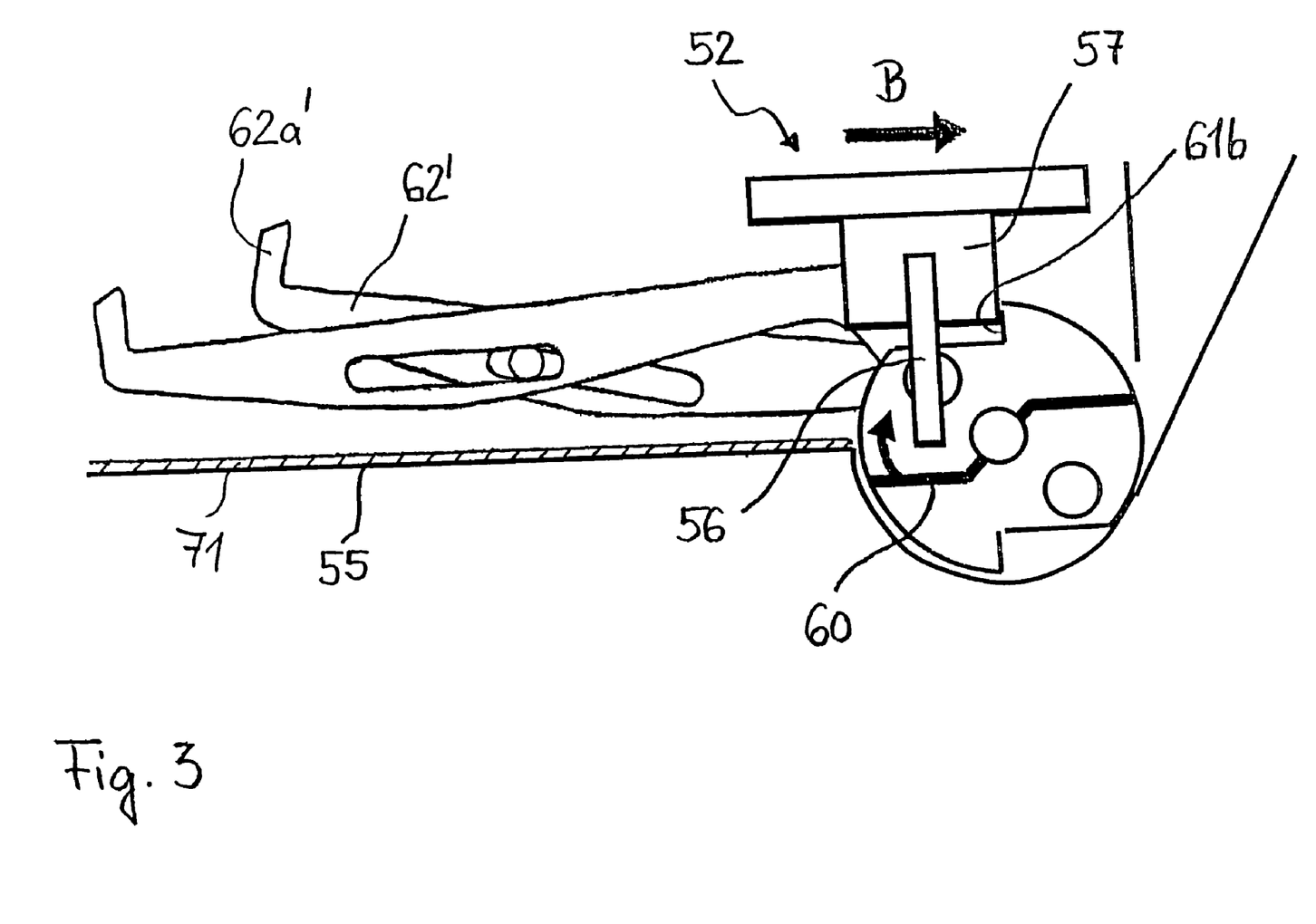
FIG. 3-5 show the device for applying layers of a powder material of FIG. 2 in different phases of its operation.

In a stage of operation of the device shown in FIG. 3 the application device pushes against the cam 61b with the first actuation element 57 and rotates the conveyor roller by an angle of approximately 20°-40° until it has arrived in a first end position. Thereby, powder on the first paddle 60 is lifted at the side of the blade 56 facing the construction field (construction field side). When the application device is in the first end position, a good portion of the powder on the paddle 60 (seen in a direction perpendicular to the work plane) is above the level that is defined by the lower end of the blade. Simultaneously to the rotation of the conveyor roller the hook-shaped portion 62a' at the one end of the con-rod 62' is lifted with respect to the work plane 55. Thus, the device is prepared for the application of a next powder layer by moving the application device in a direction away from the conveyor roller to the second end position at the other side of the construction field.

After the application of the layer 71 of the material in powder form the solidification at positions in this layer corresponding to the cross-section of the object is effected by exposition to the laser in a manner known as such.

Thereby, it is in particular decisive for the quality of the finished object that the temperature of the top-most powder layer to be solidified has a temperature within a certain range, the process window. Above this process window the powder is already sintered without additional irradiation energy, whereas at temperatures below the process window warping occurs in the solidified layer. In many cases also the so-called curl effect, where the edges of the solidified layer bend up or roll up, is ascribed to a temperature of the top-most powder layer that is too low. Therefore, in order to achieve good results, in particular in order to avoid a warping in the manufactured object, the powder layer applied with the application device before the solidification has to be heated with the heating device 12 to a working temperature $T_A$ within the process window.

To this effect after the application of the powder layer the temperature of this layer is measured by the temperature measuring device 13. Depending on the temperature measured in this process the heating power of the heating device 12 is determined. After the top-most powder layer has been heated up to the working temperature $T_A$, the positions in the layer of the building material corresponding to the cross-section of the object are solidified by irradiation with the laser.

After the solidification of a layer the support 2 is lowered by a distance corresponding to the layer thickness and a new powder layer 73 is applied with the application device onto the layer 71 that has been previously exposed to the laser.

Figure 4:
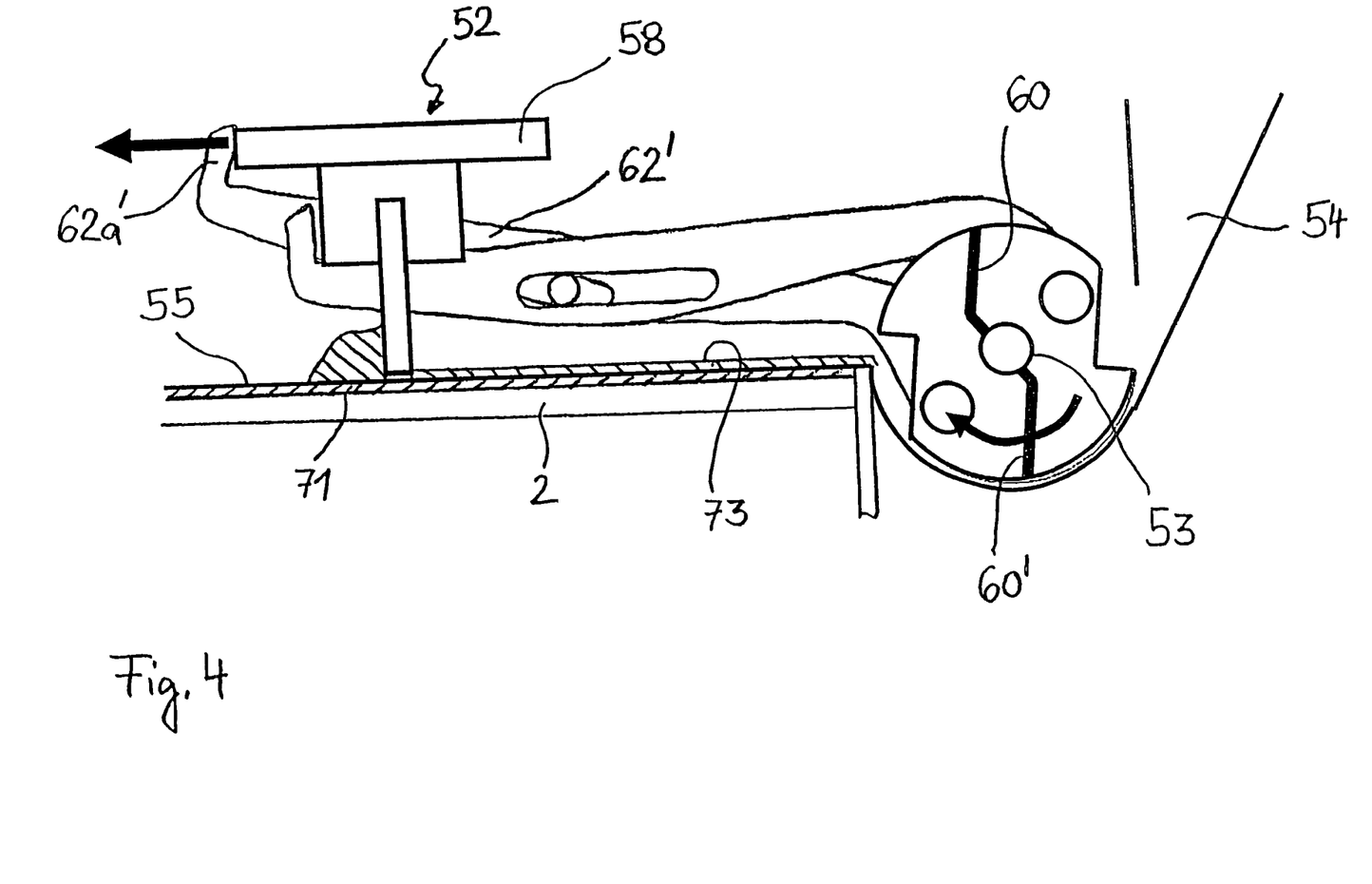

In an operating stage that is shown in FIG. 4 the application device 52 moves away from the conveyor roller 53 in a direction, which is parallel to the work plane 55, in order to create the next powder layer 73. In the process the second actuation element 58 finally pushes the lifted hook-shaped portion 62a' of the con-rod 62'. Thereby, the con-rod 62' is taken along in the direction of movement of the application device 52 and the conveyor roller 53 is further rotated. In this process the conveyor roller is rotated by an angle of approximately 140°-160°. The excess powder that is still on the paddle 60 is conveyed to the feeding area below the feeding chute 54. At the same time powder from the feeding area is transported by the second paddle 60' from the feeding area in a direction towards the construction field. The powder in the feeding area consumed in this process thereby re-trickles from the feeding chute. When the feeding area is filled up with powder, the re-trickling, i.e. the feeding of powder from the feeding chute, stops by itself. At this stage, with the movement of the con-rod 62' the hook-shaped portion 62a' again drops towards the work plane 55 until the second actuation element no longer bears against it and the con-rod 62' is no longer taken along by the application device 52.

Figure 5:
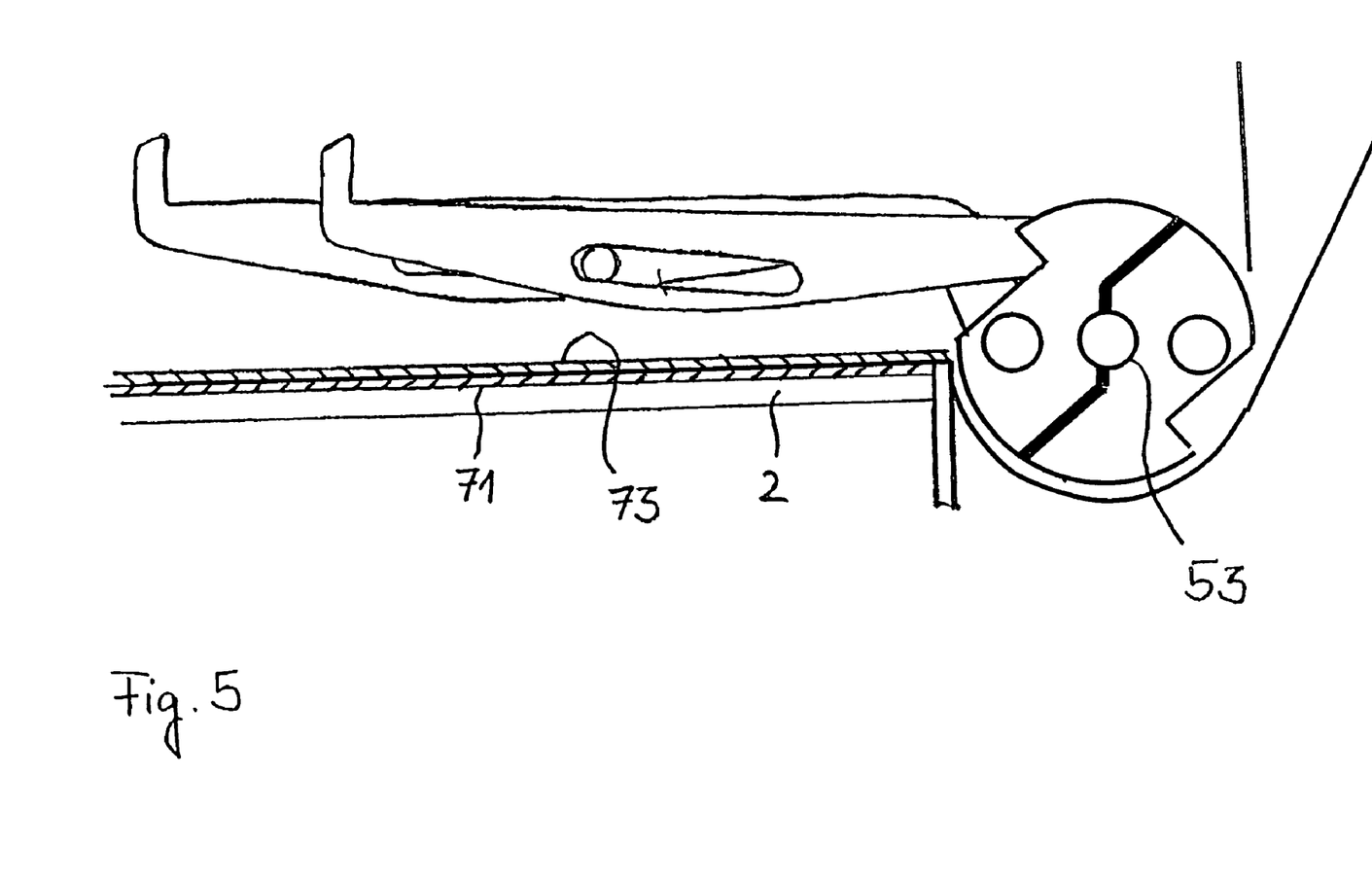

In FIG. 5 the device is illustrated at the operating stage, in which the application device 52 is positioned on the other side of the construction field, which is not illustrated in FIGS. 2 to 5. The application device is moved in a direction away from the conveyor roller 53 until within the whole construction field a layer 73 of the powder material has been applied by the application device. At this stage the conveyor roller 53 is rotated by 180° with respect to the position that is illustrated in FIG. 2.

With the help of FIGS. 2 to 5 the operation of the material transport device and the material supply device on a first side of the construction field has been described. At the other, second, side, which is opposed to the first side of the construction field, a similar device is provided, which consists of a conveyor roller, a trough, a feeding device and con-rods and works in the same way as it was described by FIGS. 2 to 5 above. In order to create the next layer, the application device 52 is again moved in a direction towards the conveyor roller 53, as shown in FIG. 2.

Then, the previously described steps are repeated until the manufacturing of the three-dimensional object is finished.

Figure 6:
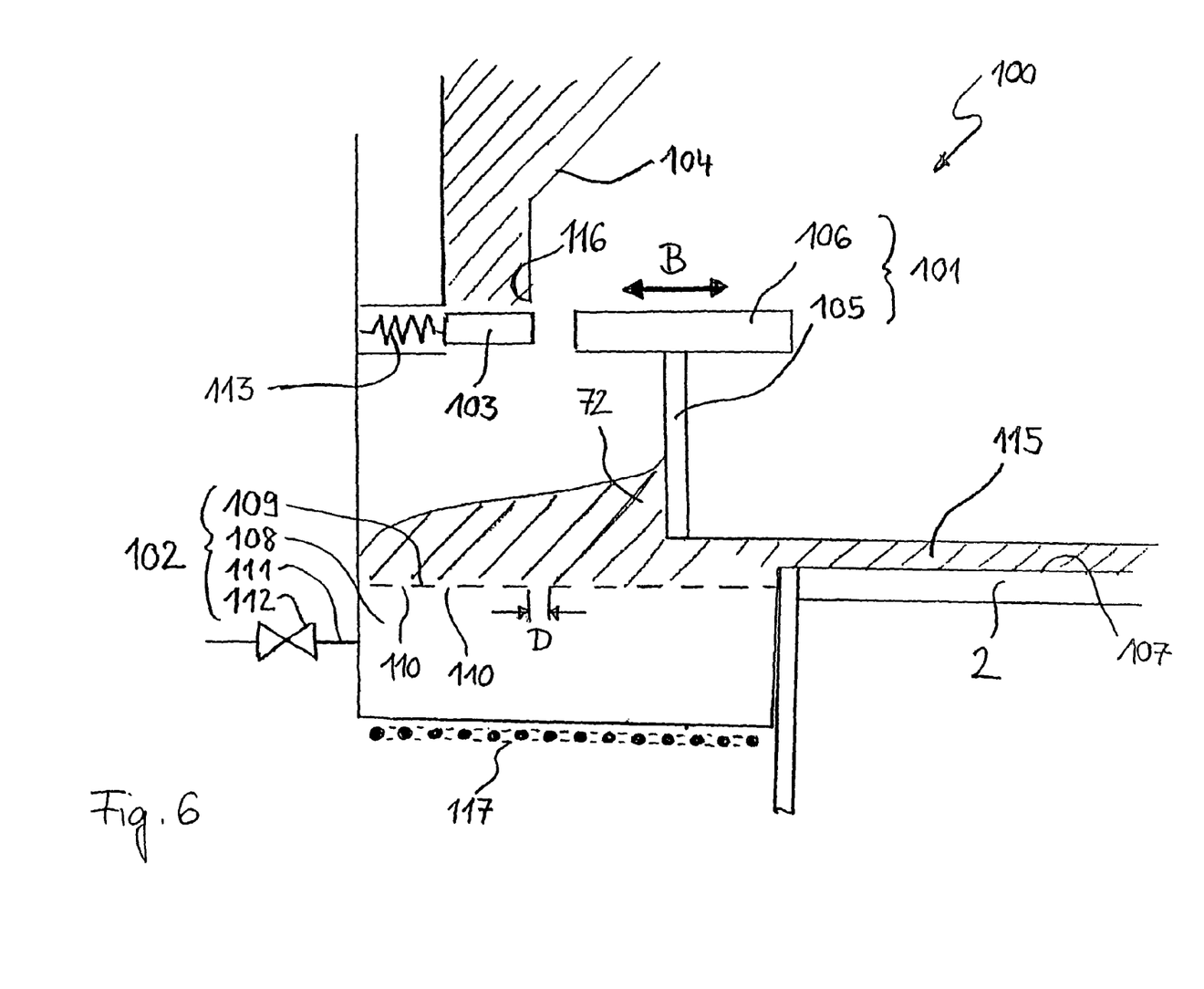
FIG. 6 shows a schematic drawing of a second embodiment of the device for applying layers of a powder material.

In FIG. 6 a device 100 for applying layers of a powder material according to a second embodiment is shown.

The device for a repeated creation of a powder layer according to a second embodiment comprises an application device 101, a material transport device formed as fluidization device 102 and a feeding device 104 provided with a cover 103.

The application device 101 is movable back and forth above a work plane 107 between two end positions by means of a drive indicated by an arrow B in the same way as in the first embodiment. It comprises a blade 105 and an actuation element 106.

The fluidization device includes a chamber 108 for pre-heating the nitrogen that is used for the fluidization, a fluidization sheet 109, by which the chamber 108 is closed at the top, and a pipe 111 for supplying nitrogen into the chamber 108, which is provided with a valve 112. The chamber 108 is provided with a heating device 117 (e.g. a resistive heating with temperature control) for pre-heating the nitrogen. The fluidization sheet 109 is provided with a plurality of small openings 110 that have a smaller diameter D than the powder grains that are used. A gas supply 111 leads into the chamber 108, wherein the supply of gas into the chamber can be controlled via a valve 112.

A material feeding device 104 having a cover 103 is formed above the fluidization sheet. The cover 103 is formed and positioned in such a way that when moving the application device to its end position by the actuation element 106, it is pushed aside and thereby the material feeding device having an opening 116 is opened towards a feeding region located below the material feeding device. To this effect, the actuation element 106 is formed in such a way that during the opening of the cover the actuation element 106 itself does not get into the opening region of the material feeding device. In particular, during the opening the actuation element pushes the cover 103 behind or in front of the opening 116 of the container 104 when seen from a direction, which is perpendicular to the drawing plane of FIG. 6. The cover is laterally attached to a side wall by a spring 113, which presses the cover into the closed position when the actuation element 106 does not push against the cover 103.

On the other side of the construction field a further second material feeding device and a further second fluidization device are provided mirror-symmetrically to the above-mentioned material feeding device and fluidization device.

During operation at first a first powder layer 115 is applied onto the work plane 107 by moving the application device across the construction field parallel to the work plane 107 in a direction towards the material feeding device. Thereby, excess powder is shoved out of the construction field to the outside onto the fluidization sheet 109. The application device is further moved to its end position and by a pushing of the actuation element 106 against the cover 103 thereby opens the material feeding device 104, from which powder re-trickles into the feeding region below the material feeding device until this is filled up and the re-trickling stops by itself. Subsequently the application device is moved just as far from the end position as is sufficient for closing again the material feeding device via the spring 113 and the cover 103.

By opening the valve 112 for a short time and letting nitrogen into the chamber 108 via the supply pipe 111, a pressure impulse is created in this chamber, which leads to a discharge of pre-heated nitrogen out of the openings 110 into the powder above the fluidization sheet 109. Thereby this powder is fluidized and flows through the gap between the blade and the fluidization sheet from the feeding region at the one side of the blade 105 to the other side of the blade that faces the construction field. Thereby, the application device is prepared for the application of a next powder layer.

As in the first embodiment, the powder layer is pre-heated by the heating device 12 in a manner known as such and is solidified at the positions corresponding to the cross-section of an object.

In the next step after the lowering of the support 2 as in the first embodiment the application of a next powder layer onto the work plane within the construction field takes place by moving the application device from the first end position to the second end position at the other side of the construction field.

The operation of the second feeding device and the second material transport device is like the above-described operation of the devices shown in FIG. 6.

Then, the previously described steps are repeated until the manufacturing of the three-dimensional object is finished.

Alternatives and variations of the above-described devices and the above-described methods are possible.

The device according to the second embodiment has been described having a fluidization device, wherein the fluidization is achieved by introducing pre-heated nitrogen. However, the fluidization can also be effected by introducing another gas. A further possibility of achieving the fluidization is to set the powder into vibrations.

The device according to the first and the second embodiment has been described such that on both sides of the construction field the same material transport devices and material feeding devices are provided. However, it is possible to combine the devices according to the first and the second embodiments such that on the one side of the construction field a material transport device and a material feeding device according to the first embodiment are provided, whereas on the other side a material transport device and a material feeding device according to the second embodiment are provided.

It is also possible, like in the first and second embodiments, to provide on both sides of the construction field a material transport device according to the invention, however, to provide a material feeding device only on one side of the construction field. Accordingly, during operation the material transport device on that side, at which the material feeding device is located, has to provide an amount of material that is sufficient for two layers. This modification allows a simpler and more compact design of the device.

The invention has been described by means of a laser sintering device, in which a laser is used as radiation source. Any other radiation source by which electromagnetic or particle radiation may be introduced into the building material, is possible. Thus, e.g. a radiation source for incoherent light radiation, for IR radiation, for X-ray radiation or for electron radiation may be used as radiation source. Accordingly, a building material has to be used, which can be solidified by the corresponding radiation.

Alternatively, the device for applying powder layers according to the invention may also be used in 3D printers, in which the powder layers are solidified by selectively applying a binder or adhesive at the cross-section of the object to be manufactured.

In the above-described device an infrared radiator above the work plane is described as heating device. Other possibilities of heating a previously applied layer of the building material are conceivable. For example, the circulation of warm air or nitrogen that is led across the recently applied layer can be used for a pre-heating of the layer.

The embodiment of a device for manufacturing a three-dimensional object has been provided with a heating device for pre-heating an applied, but not yet sintered, powder layer to a work temperature $T_A$ that is suitable for the solidification and sintering, respectively, as well as with a temperature measuring device that serves for measuring the temperature of the previously applied and top-most powder layer, respectively. Depending on the material that is used and the process control a pre-heating of the applied material layer can be abandoned in the device for manufacturing of a three-dimensional object according to the invention. Accordingly, the device for manufacturing a three-dimensional object may also be constructed without a heating device and without a temperature measuring device.

The second embodiment has been described such that the fluidization is accomplished by means of a pre-heated gas. However, it is also possible to implement the fluidization by a gas that was not pre-heated. Accordingly, the fluidization device need not necessarily include a heating device for pre-heating the gas used for fluidization.

The invention claimed is:

1. Device for applying layers of a powder material in a construction field, comprising an application device, which can be moved in parallel to said construction field back and forth between two end positions in order to apply a layer of material and which comprises a blade for removing excess material when generating a layer of material, characterized by a material transport device, which is adapted to transfer material from one side of the blade away from said construction field to the other side of the blade facing said construction field, wherein the material transport device comprises a conveyor roller, which is rotatable around an axis, for the transfer of material from the one side to the other side of the blade.

2. Device according to claim 1, further comprising a material feeding device that comprises a supply container for the material and is formed such that the supply of material to a feeding region is automatically interrupted, when there is a predetermined amount of material in the feeding region.

3. Device according to claim 1, wherein a mechanics is provided, by which the movement of the application device is coupled to the rotation of the conveyor roller such that by a singular back and forth movement of the application device material is transported from one side of the blade to the other side of the blade by means of the conveyor roller.

4. Device according to claim 1, wherein the conveyor roller comprises two paddles that are mirror-symmetrical to the axis of rotation of the conveyor roller.

5. Device according to claim 1, wherein the conveyor roller is a roller having at least one chamber that is formed such that it is a recess, by which through a rotation of the roller material is transported from one side of the blade to the other side of the blade by means of the chamber.

6. Device according to claim 1, wherein a trough is provided that is adapted to the shape of the conveyor roller and accommodates a part of the conveyor roller.

7. Device according to claim 6, wherein the trough comprises a heating for pre-heating the material in the trough.

8. Device for applying layers of a powder material in a construction field, comprising an application device, which can be moved in parallel to said construction field back and forth between two end positions in order to apply a layer of material and which comprises a blade for removing excess material when generating a layer of material, characterized by a material transport device, which is adapted to transfer material from one side of the blade away from said construction field to the other side of the blade facing said construction field, wherein the transport device is a fluidization device, by which gas can be blown into the material such that the material fluidizes and flows from one side of the blade to the other side of the blade, when the application device is in a predetermined position.

9. Device according to claim 1, wherein at each of the two sides of the construction field that correspond to the two end positions of the application device, a transport device is provided.

10. Device for manufacturing a three-dimensional object by solidifying layers of a material at positions corresponding to the respective cross-section of the object by means of a device for applying layers of a powder material according to claim 1.

* * * * *

UNITED STATES PATENT AND TRADEMARK OFFICE
CERTIFICATE OF CORRECTION

| | | |
|---|---|---|
| PATENT NO. | : 7,820,241 B2 | Page 1 of 1 |
| APPLICATION NO. | : 11/667345 | |
| DATED | : October 26, 2010 | |
| INVENTOR(S) | : Hans Perret et al. | |

It is certified that error appears in the above-identified patent and that said Letters Patent is hereby corrected as shown below:

Claim 1, Column 7, line 39: please delete "from one side of the blade away from said construction" and insert -- from one side of the blade facing away from said construction --.

Claim 8, Column 8, line 29: please delete "from one side of the blade away from said construction" and insert -- from one side of the blade facing away from said construction --.

Signed and Sealed this
Twenty-ninth Day of March, 2011

David J. Kappos
*Director of the United States Patent and Trademark Office*